US007147293B2

(12) United States Patent
Bienick et al.

(10) Patent No.: US 7,147,293 B2
(45) Date of Patent: Dec. 12, 2006

(54) ENCAPSULATED WIRE SHELF

(75) Inventors: Craig Bienick, Jenison, MI (US); Bob Herrmann, Spring Lake, MI (US); Ole Carl Buesing, Lowell, MI (US)

(73) Assignee: Gemtron Corporation, Sweetwater, TN (US)

( * ) Notice: Subject to any disclaimer, the term of this patent is extended or adjusted under 35 U.S.C. 154(b) by 231 days.

(21) Appl. No.: 10/355,101

(22) Filed: Jan. 31, 2003

(65) Prior Publication Data
US 2004/0150305 A1 Aug. 5, 2004

(51) Int. Cl.
F25D 11/00 (2006.01)
A47B 96/02 (2006.01)

(52) U.S. Cl. .................. 312/408; 211/153; 312/410
(58) Field of Classification Search ............ 312/401, 312/408, 410; 62/382; 108/27; 211/90.03, 211/153
See application file for complete search history.

(56) References Cited

U.S. PATENT DOCUMENTS

| | | | | |
|---|---|---|---|---|
| 1,591,328 A | | 7/1926 | Lachman | |
| 2,276,942 A | | 3/1942 | Dibble | |
| 2,309,212 A | * | 1/1943 | Reeves | 211/153 |
| 2,407,721 A | * | 9/1946 | Nauert | 211/153 |
| 2,421,089 A | * | 5/1947 | Smith | 211/153 |
| 2,599,807 A | * | 6/1952 | Burrise | 211/153 |
| 2,640,248 A | | 6/1953 | Saffert | |
| 2,876,910 A | * | 3/1959 | Morton, Jr. | 211/153 |
| 2,924,850 A | | 2/1960 | Schultz | |
| 3,107,991 A | * | 10/1963 | Taussig | 160/354 |
| 3,224,081 A | | 12/1965 | Richter | |
| 3,387,075 A | | 6/1968 | Wilcox | |
| 3,446,361 A | | 5/1969 | Douty | |
| 3,530,541 A | | 9/1970 | Burns | |
| 3,637,085 A | * | 1/1972 | Ball | 211/153 |
| 3,767,155 A | | 10/1973 | Hovorka | |
| 3,998,069 A | * | 12/1976 | Kronenberger et al. | 211/183 |
| 4,058,432 A | | 11/1977 | Schuster-Woldan et al. | |
| 4,236,689 A | | 12/1980 | Hass | |
| 4,314,960 A | | 2/1982 | Hass | |
| 4,405,083 A | | 9/1983 | Charlebois et al. | |
| 4,448,464 A | | 5/1984 | Reichert et al. | |
| 4,462,645 A | | 7/1984 | Ballarin et al. | |
| 4,584,155 A | | 4/1986 | Zanella | |
| 4,688,752 A | | 8/1987 | Barteck et al. | |
| 4,854,599 A | | 8/1989 | Barteck | |
| 4,934,541 A | * | 6/1990 | Bussan et al. | 211/153 |
| 5,004,302 A | | 4/1991 | Stocking et al. | |
| 5,082,124 A | | 1/1992 | Bonvini et al. | |
| 5,188,246 A | | 2/1993 | Maxworthy | |
| 5,196,210 A | | 3/1993 | Yoshihara et al. | |
| 5,362,145 A | | 11/1994 | Bird et al. | |
| 5,441,338 A | * | 8/1995 | Kane et al. | 312/408 |
| 5,441,397 A | | 8/1995 | Eriksen et al. | |
| 5,454,706 A | | 10/1995 | Midorikawa et al. | |
| 5,564,809 A | * | 10/1996 | Kane et al. | 312/408 |

(Continued)

Primary Examiner—Peter R. Brown
(74) Attorney, Agent, or Firm—Diller, Ramik & Wight

(57) ABSTRACT

The shelf as defined by a shelf grating formed of a plurality of first and second groups of wires disposed normal to each other and having ends thereof encapsulated by an injection molded, continuous open encapsulation, rim or border. Preferably, each of four border portions of the border each encapsulate substantially the entirety of one of the wires of the two groups to afford rigidity to the wire shelf. The border includes a Class "A" upper surface between peripheral outboard and inboard parting lines or lines of flash which provides a high degree of aesthetics to the shelf when viewed from above.

84 Claims, 11 Drawing Sheets

U.S. PATENT DOCUMENTS

| | | | |
|---|---|---|---|
| 5,660,777 A * | 8/1997 | Herrmann et al. | 264/154 |
| 5,661,944 A | 9/1997 | Sprecht | |
| 5,676,894 A | 10/1997 | Sprecht | |
| 6,071,108 A | 6/2000 | Gohr et al. | |
| 6,302,673 B1 | 10/2001 | Frechette et al. | |
| 6,422,673 B1 | 7/2002 | Bienick | |
| 2003/0117050 A1* | 6/2003 | Hamilton | 312/408 |

* cited by examiner

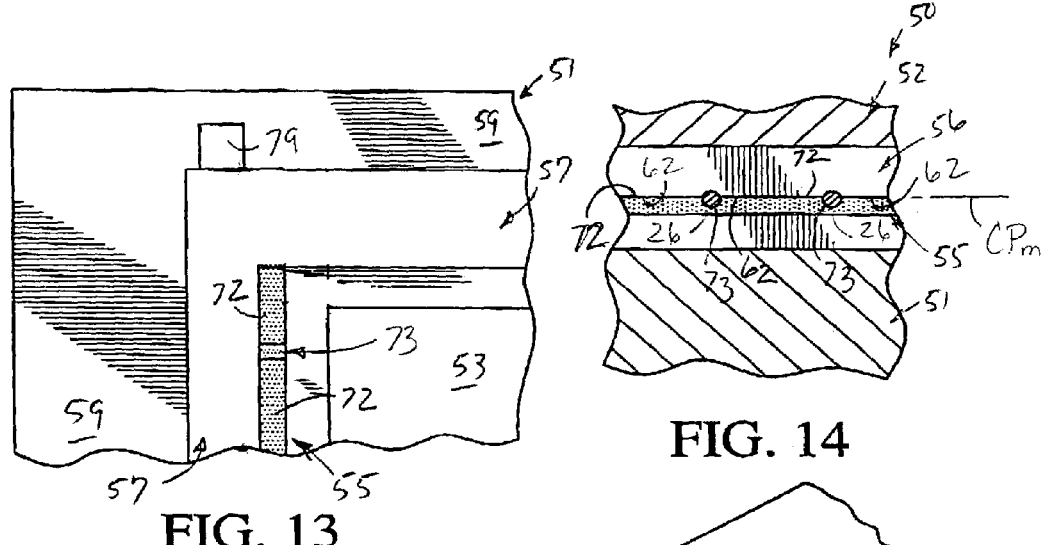
FIG. 13
FIG. 14
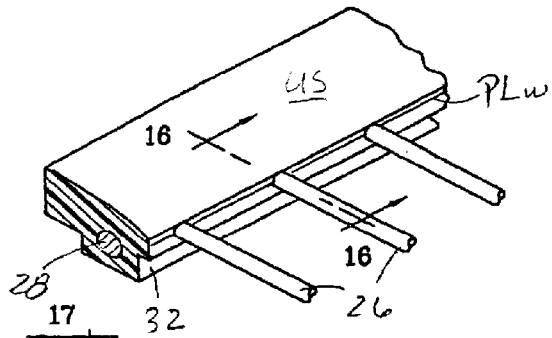
FIG. 15
FIG. 16
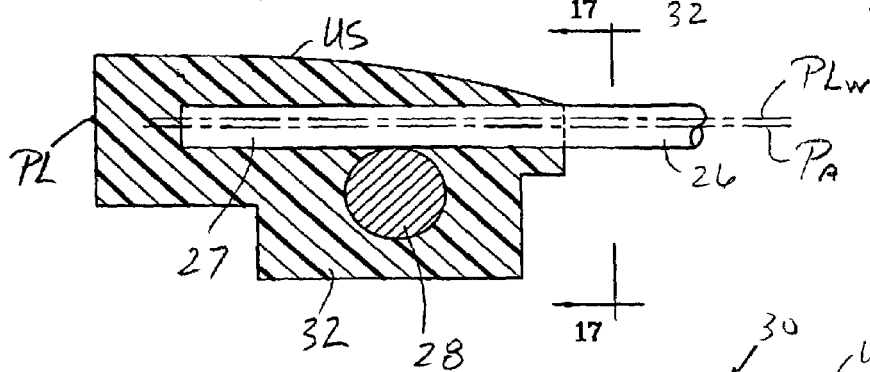
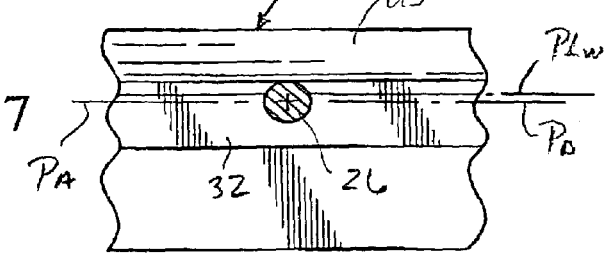
FIG. 17

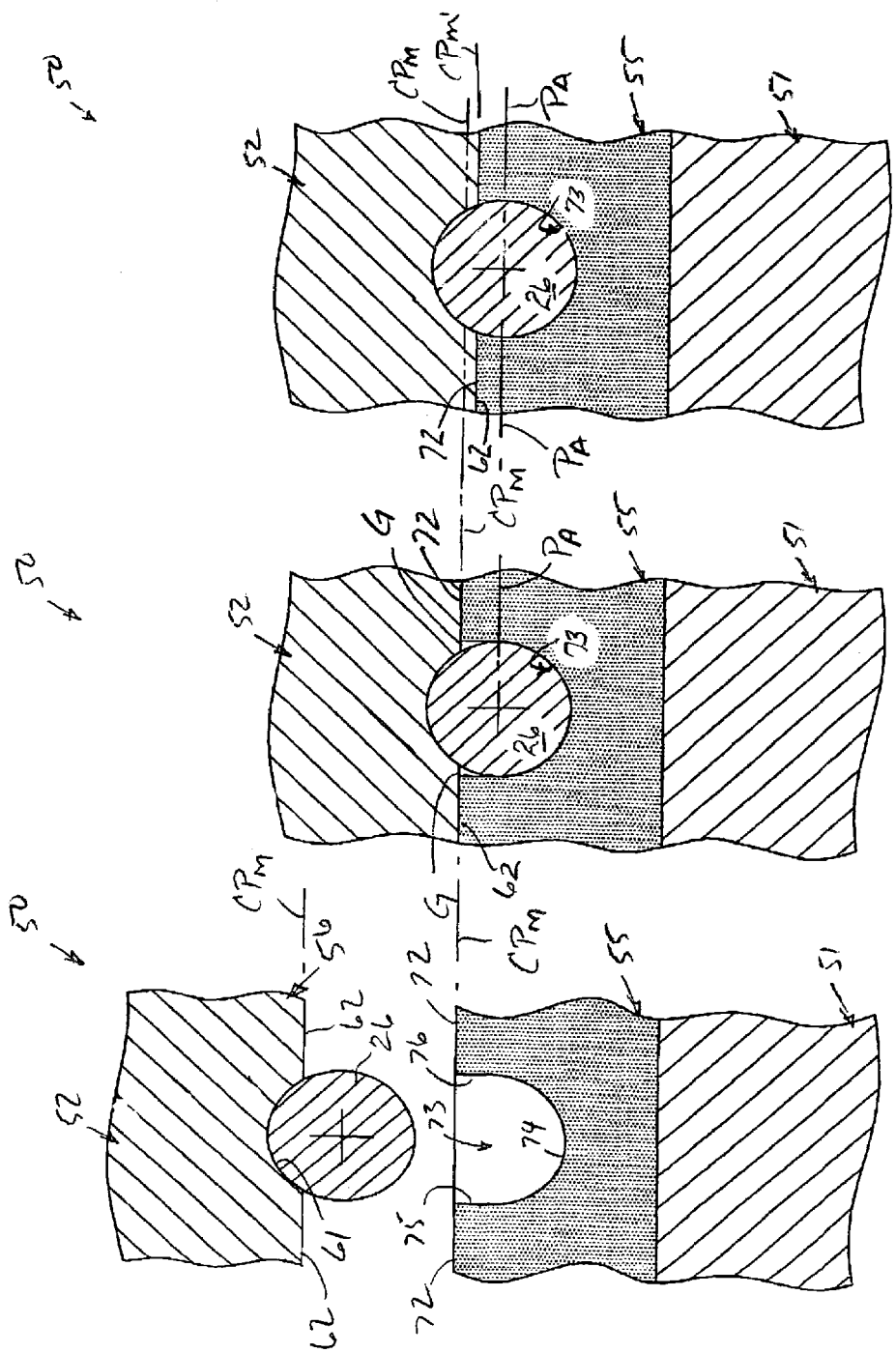

ENCAPSULATED WIRE SHELF

BACKGROUND OF THE INVENTION

Adjustable shelves are commonly associated with both the freezer compartment and the fresh food compartment of conventional refrigerators. When the shelves are constructed as sliding shelves, opposite generally parallel sides of the shelves rest upon and slide relative to horizontally aligned ribs or grooves formed in opposing pairs in side walls or inner liners of the compartments. Other such shelves slide relative to shelf brackets which have hooks hooked into slots of vertical tracks mounted in the refrigerator compartments. Typical sliding shelves are exemplified by the disclosures of U.S. Pat. Nos. 6,422,673 B1 and 5,362,145 issued respectively on Jul. 23, 2002 and Nov. 8, 1994. In each case the shelves in their most simplistic construction are defined by a piece of tempered glass bordered by a rim or border which is either snap-secured or injection molded to the tempered glass.

It is also conventional to utilize vertically adjustable shelves in refrigerators which, instead of a tempered glass panel, utilize a supporting surface defined by crossing wires. Wire shelves typical of the latter construction are disclosed in U.S. Pat. No. 5,004,302 granted on Apr. 2, 1991. Two groups of wires are normal to each other and are welded or otherwise secured to cantilevered brackets which can be vertically adjusted within compartments of a refrigerator.

Other conventional shelves are injected molded as a single piece of material, as disclosed in U.S. Pat. No. 5,188,246, and have a hook for cantilevered support from a slat wall typically used in stores and supermarkets. Hollow ribs reduce the weight of the shelf while providing requisite rigidity for supporting articles/products thereupon.

U.S. Pat. No. 3,446,371 granted on May 27, 1969 describes the manufacture of "wire racks" by "laying many wires across two edge members and then welding the wires to the edge members. The exposed cut ends of the wires must be finished to eliminate the dangerous sharp edge. After the finishing operation, some racks are dipped in plastic for decorative and protective purposes, while others are protected by chrome plating." The disadvantages of such racks include the cut ends which create dangerous sharp edges and welding which is "an expensive step in the manufacture of present racks." This patent avoids the latter disadvantages by encasing each wire in a plastic coating, inserting the ends of each wire through slots into a metal shell and filling the shells with a plastic filling which fills the shells and forms a homogeneous bond with the plastic coated wires. Alternatively, the side shells are not utilized but instead plastic coated wires are placed atop opposite parallel metal bars and the latter are encapsulated by plastic introduced into molds which cures and is bonded to the plastic of the wires.

BRIEF SUMMARY OF THE INVENTION

In accordance with the present invention, a "wire" shelf is constructed in a manner which avoids all of the disadvantages set forth in the latter patents, is relatively inexpensive to manufacture as compared to known shelves, and possesses an aesthetic appearance heretofore unprovided in wire shelves, be they sliding, stationary and/or adjustable.

In accordance with the present invention, a wire shelf is manufactured by first forming a shelf "grate" from first and second members or wires disposed substantially normal to each other. The plurality of wires are welded to each other to form a dimensionally stable shelf "grate" with the ends of the wires being precisely located and relatively spaced from each other to enable the performance of a subsequent injection molding operation initiated by locating the ends of the wires in grooves of a movable Class "A" mold half of a two-piece injection mold which defines a mold cavity in conjunction with a stationary or fixed mold half. The Class "A" finish of the movable mold half, including the precisely dimensioned and relatively located grooves thereof which receive ends of the wires, provides precise location of the shelf grate during an injection molding operation and imparts a Class "A" finish to the surface of an encapsulation, rim or border formed by the injection molded polymeric/copolymeric material. Each of the grooves of the movable Class "A" mold half is also less than 180° and is opposed by a silicone seal carried by the fixed mold half. The latter allows the ends of the wires of the shelf grate to be readily inserted into the wire end receiving grooves of the movable mold, yet when the molds are closed, the silicone seal is compressed and substantially entirely embraces diametrically opposite surface portions of each wire adjacent the parting line of the mold to preclude or reduce "flash" of the polymeric/copolymeric material upon the injection thereof to thereby further enhance the aesthetics of the wire shelf. By encapsulating substantially all of the ends of all of the wires, a substantially rectangular or polymeric open border is created whose upper surface, formed by the Class "A" surface of the movable metal mold half, is normally visible from above when installed in a refrigerator compartment and thus presents an aesthetic surface to an observer/user. Obviously, the less aesthetic lower surface of the border is not observable to a viewer. In this fashion an aesthetic, relatively inexpensive, substantially rigid and virtually indestructible wire shelf is readily available for utilization in refrigerators, microwave ovens, point of sale displays, etc.

In further accordance with the present invention, at least four of the wires or wire members, those defining opposite parallel side edges and opposite parallel front and rear edges of the border are substantially totally encapsulated by the injection molded polymeric/copolymeric material of the border which adds further rigidity to the overall wire shelf.

In further accordance with the present invention, the slidable wire shelf can be constructed to slide along cantilevered shelf brackets which are in turn hooked to slotted vertical tracks in a refrigerator compartment, as opposed to sliding along ribs or grooves in the inner liner of the refrigerator compartment. In the latter embodiment of the invention, none of the ends of any of the wire members project beyond the border of the wire shelf, whereas encapsulated ends of selective wires can project beyond side border portions of shelves which slide along ridges/ribs or in grooves of refrigerator compartment inner liners.

In further accordance with this invention, the encapsulation of the ends of the grate during the injection molding process can also be utilized to encapsulate simultaneously therewith upper flanges of cantilevered shelf brackets made of sheet material or wires having hooks at rear ends thereof for receipt in slots of vertical shelf tracks in a refrigerator compartment.

With the above and other objects in view that will hereinafter appear, the nature of the invention will be more clearly understood by reference to the following detailed description, the appended claims and the several views illustrated in the accompanying drawings.

BRIEF DESCRIPTION OF THE DRAWINGS

FIG. 13 is a fragmentary enlarged view taken generally along line 13—13 of FIG. 11, and illustrates details of the stationary mold half including a corner cavity portion for encapsulating several wire ends including an end of one of the wire members outboard of a border side portion.

FIG. 14 is a fragmentary cross-sectional view taken generally along line 14—14 of FIG. 12, and illustrates several of the wires of the shelf grate located between the grooves of the respective movable and fixed mold halves.

FIG. 15 is a fragmentary perspective view of the rear border portion of the wire shelf, and illustrates details of the wire members relative thereto.

FIG. 16 is an enlarged fragmentary cross-sectional view taken generally along line 16—16 of FIG. 15, and illustrates the horizontal planar spaced relationship between a plane through the axes of uppermost wire members and a parting plane defined by a plane through common surfaces between adjacent wire-receiving grooves of the movable mold half.

FIG. 17 is a cross-sectional view taken generally along line 17—17 of FIG. 16, and illustrates a parting line lying in a plane above a plane taken through the axes of the upper wire members.

FIG. 19 is a highly enlarged fragmentary cross-sectional view taken generally along line 19—19 of FIG. 1, and illustrates a wire end of the shelf grate secured in a locating and sealing groove of the upper movable mold half in alignment with a groove of the seal or sealing means of the fixed mold half incident to mold closure.

FIG. 20 is a fragmentary cross-sectional view taken generally along line 20—20 of FIG. 12, and illustrates parting surfaces of the upper and lower mold halves between the wire-locating and sealing grooves thereof at the moment of contact prior to compression of the silicone seal during further relative closing movement of the mold halves.

FIG. 21 is an enlarged fragmentary cross-sectional view taken generally along line 21—21 of FIG. 12, and illustrates the completely closed condition of the mold with the silicone seal compressed into intimate embracing relationship to an exterior surface of the associated wire.

DETAILED DESCRIPTION OF THE PREFERRED EMBODIMENTS

A refrigerator R (FIG. 1) includes a fresh food and/or freezer compartment C. The compartment C includes a back or rear wall RW and opposite generally parallel side walls SW1 and SW2, each of which includes a plurality of vertically spaced ledges or ribs 10. Opposite ribs 10 project toward each other in associated pairs in a common horizontal plane and function to support thereupon a wire shelf 20 of the present invention.

The wire shelf 20 comprises a wire grate 25 and an open, continuous peripheral border, rim or encapsulation 30 formed from injection molded synthetic thermoplastic/copolymeric material in a manner to be described fully hereinafter.

Figure 4:
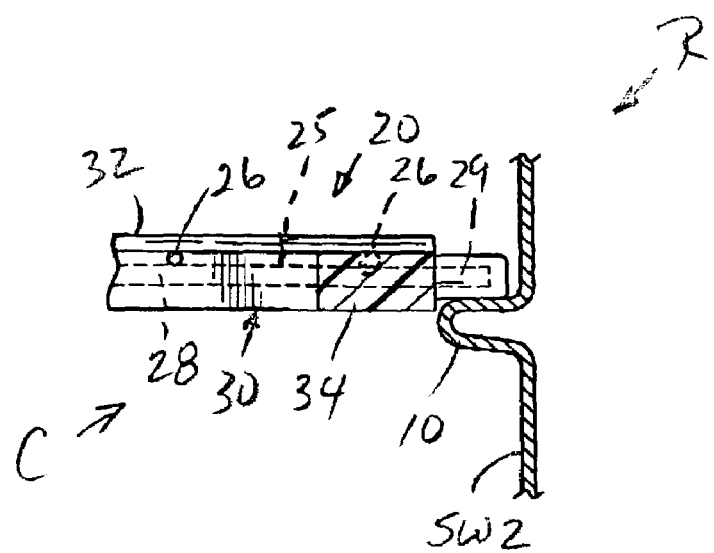
FIG. 4 is a fragmentary cross-sectional view taken generally along line 4—4 of FIG. 1, and illustrates a plastic encapsulated end of one of the wire members projecting beyond an associated side border portion in sliding relationship with one of the ribs.

The shelf grate 25 is defined by a plurality of substantially thin, elongated relatively spaced, metallic first members or wires 26 which are substantially circular in cross-section and each of which includes axially opposite ends or end portions 27. The wires or wire members 26 are in substantially parallel relationship to each other and are substantially normal to a plurality of substantially parallel elongated thin second metallic wire members or wires 28, each of which is substantially circular in cross-section and includes axially opposite ends or end portions 29 (FIG. 4). The wire members 26, 28 are located in precise spaced relationship to each other, as are the respective ends 27, 29 thereof, to assure that the respective ends 27, 29 can be precisely located relative to and inserted within wire-receiving, sealing and locating cavity portions or grooves of an associated mold, as will be described more fully hereinafter.

The wire members 26, 28 are preferably welded to each other at all crossing points CP therebetween although the welds need not be made at each crossing point CP so long as the overall shelf grate 25 is relatively rigid and the ends 27, 29 of the respective wire members 26, 28 are spatially related to each other in exact correspondence to the wire-receiving/locating/sealing cavity portions or grooves of the associated mold.

All of the wire members 26 are seated above and upon upper surfaces (unnumbered) of the wire members 28 to collectively define a substantially smooth common uniplanar horizontal surface upon which products/articles can be supported in a conventional manner. The precise materials from which the metal wire members 26, 28 are constructed are of no particular moment, nor are the diameters thereof, through preferably the lower wire members 28 are of a larger diameter to impart rigidity to the overlying wire members 26 supported thereupon. The wire members 26, 28 are preferably painted a desired color after having been welded at the crossing points CP thereof with the color being preferably identical to or complementary to the overall color or hue of the border 30.

Figure 2:
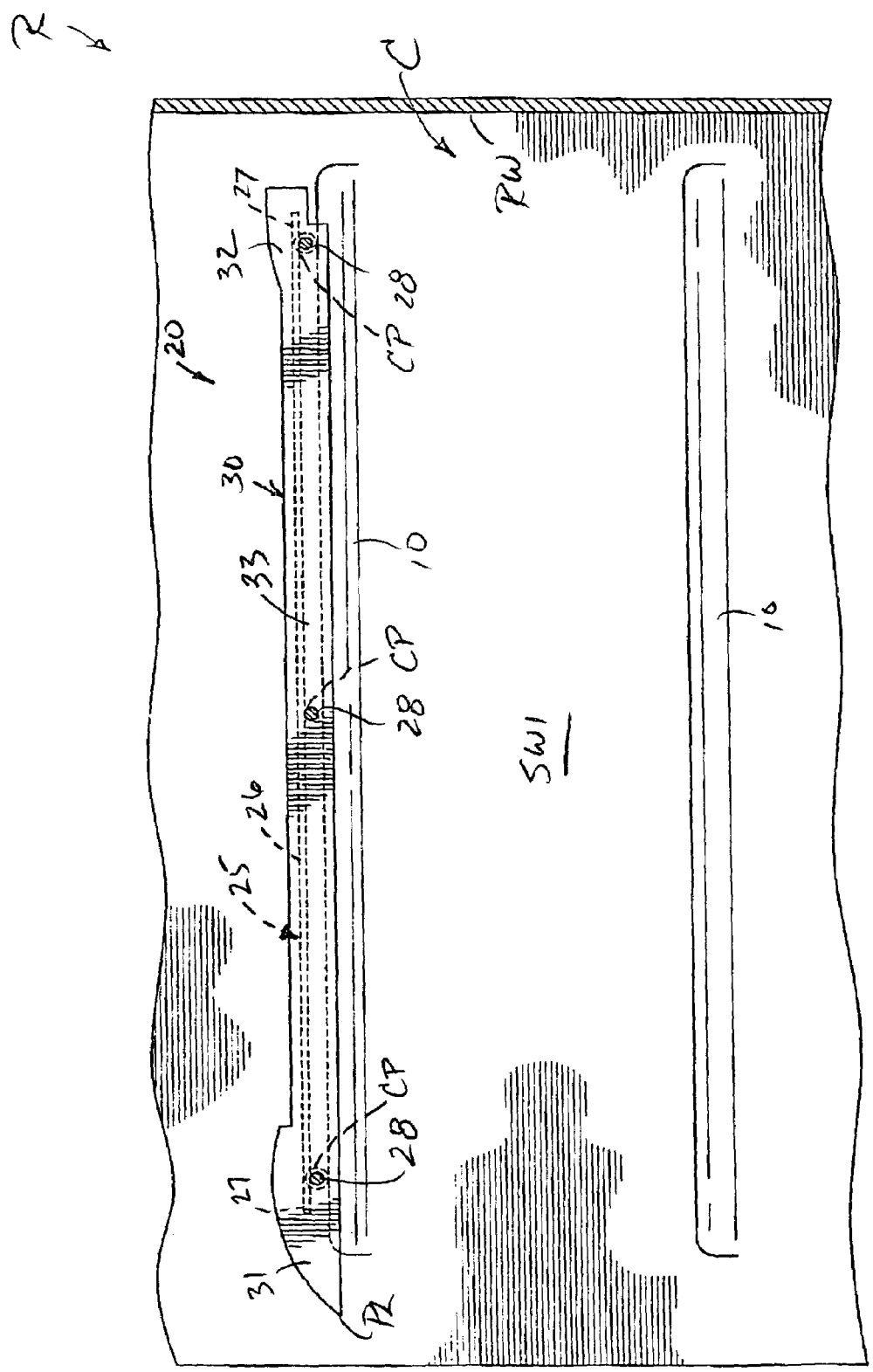
FIG. 2 is an enlarged cross-sectional view taken generally along line 2—2 of FIG. 1, and illustrates the encapsulation of several of the wire members in border portions of the border of the wire shelf.
Figure 3:
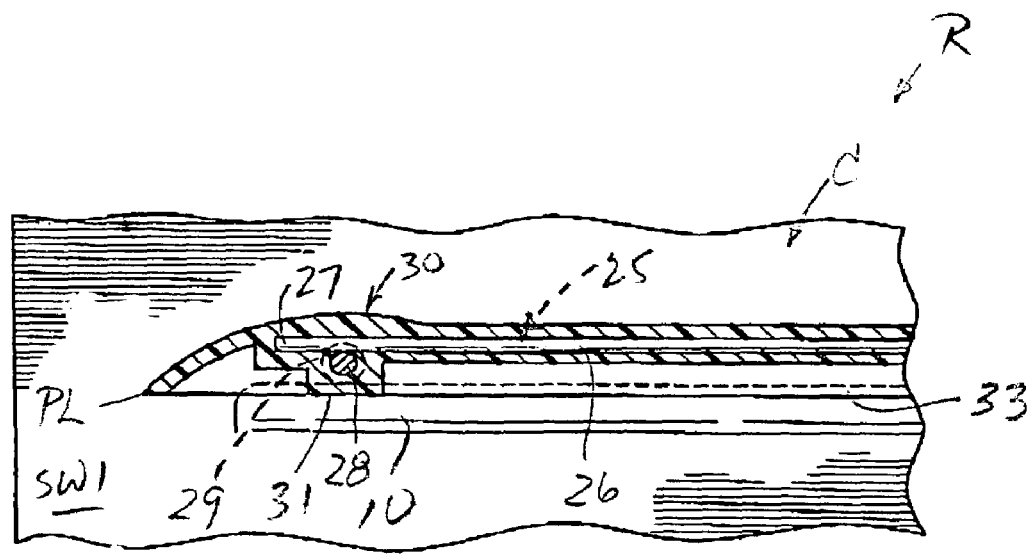
FIG. 3 is an enlarged fragmentary cross-sectional view taken generally along line 3—3 of FIG. 1, and illustrates two of the crossing wires at least partially embedded within a front border portion of the border.

The continuous, open, peripheral border 30 of synthetic thermoplastic material is defined by a front border portion 31 which is substantially parallel to a rear border portion 32 and opposite side border portions 33, 34 which are parallel to each other and are normal to the front and rear border portions 31, 32, respectively. Outermost or most remote ones of the wire members 28 are encapsulated by the front and rear border portions 31, 32, respectively, including the ends 29 of the wire members 28 which project beyond the side border portions 33, 34 (FIG. 1) and are encapsulated by the thermoplastic material, as is best illustrated in FIG. 4 of the drawings. In much the same manner, the outermost or most remote ones of the wire members 26 are totally encapsulated each in a respective one of the side border portions 33, 34 (FIGS. 2, 3 and 4). The axially opposite ends 27 of the remaining wire members 26 which are visible in FIG. 1 are encapsulated in the front and rear border portions 31, 32 of the border 20, as is illustrated in FIGS. 1 and 3, while the ends 29 of the central wire member 28 are similarly completely encapsulated within the side border portions 33, 34 (FIG. 1).

Figure 1:
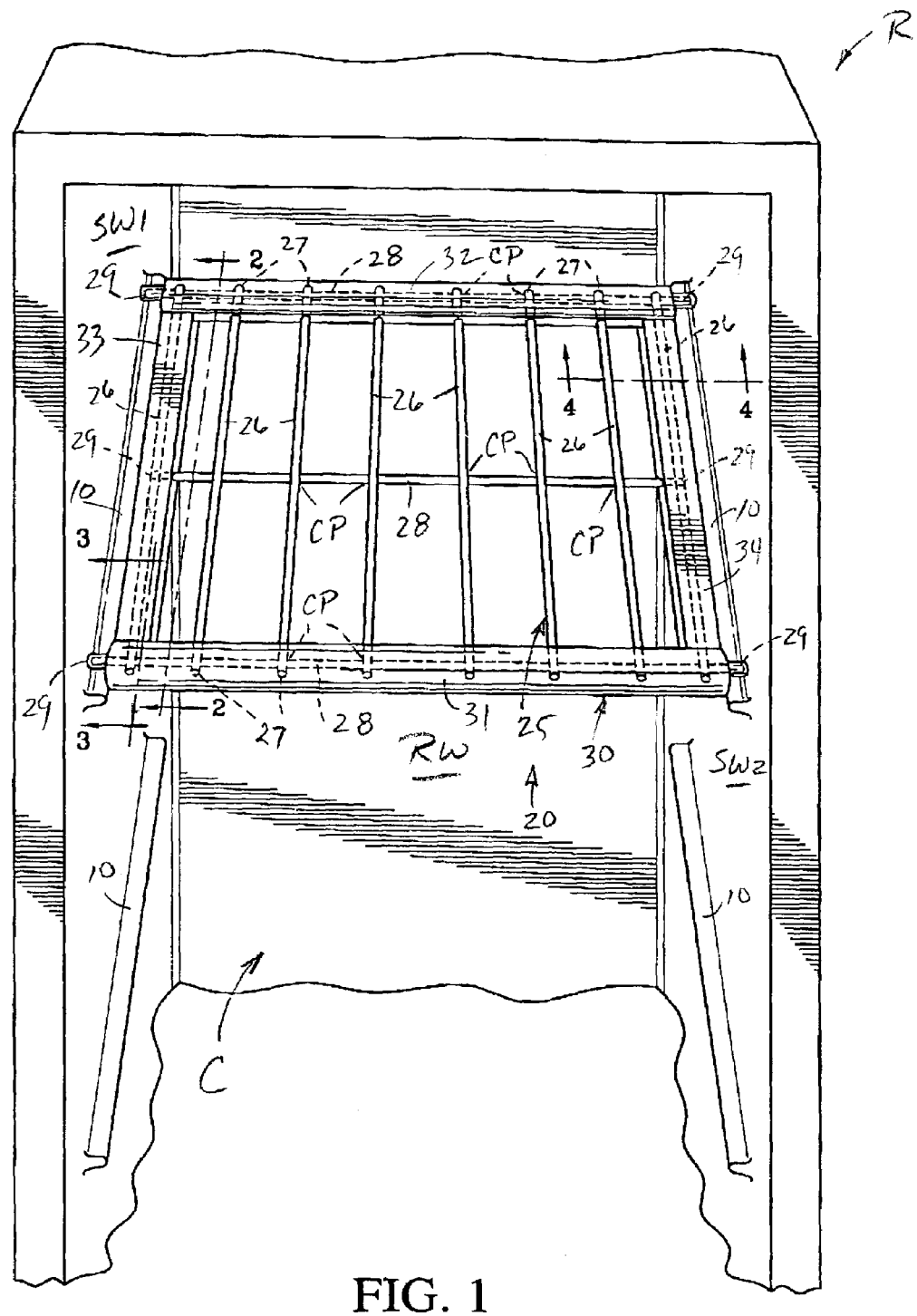
FIG. 1 is a fragmentary front perspective view of a refrigerator compartment, and illustrates a sliding "wire" shelf of the invention defined by a wire shelf grate encapsulated by an open peripheral border of injection molded synthetic polymeric/copolymeric plastic material slidable upon opposing horizontally aligned ribs/ledges of the refrigerator compartment.

It is to be particularly noted from FIGS. 1 and 4 of the drawings that the length of the front and rear border portions 31, 32, respectively, is slightly less than the distance between the rails 10, 10 upon which the wire shelf 20 slides (FIG. 1), while the thermoplastic material encapsulated ends 29 project beyond the front and rear border portions 31, 32, respectively, and ride upon upper surfaces (unnumbered) of the rails or ledges 10, 10 (FIGS. 1, 3 and 4). The low coefficient of friction of the thermoplastic material encapsulating the ends 29 of the wire members 28 effects the smooth sliding of the ends 29 upon the surfaces of the rails 10,10, while the lateral dimensioning of the front and rear border portions 31, 32, respectively, restrain the wire shelf 20 against excessive lateral motion, as is most evident from FIG. 4 of the drawings.

Figure 11:
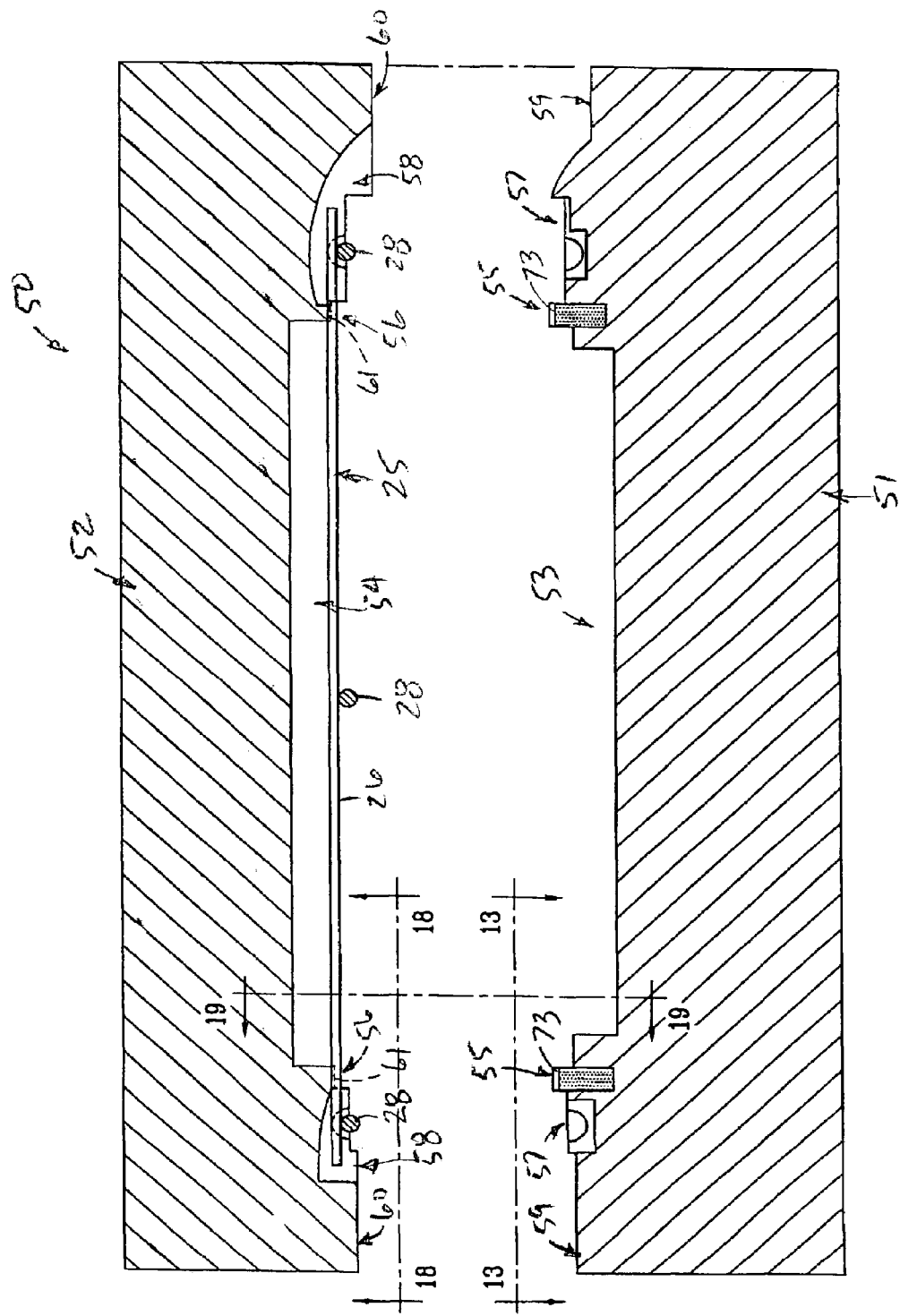
FIG. 11 is a vertical cross-sectional view taken through a two-part metal injection mold in the open position thereof, and illustrates wires of the shelf grate seated in grooves of a movable Class "A" mold half and silicone seals carried by the fixed or stationary mold half.
Figure 12:
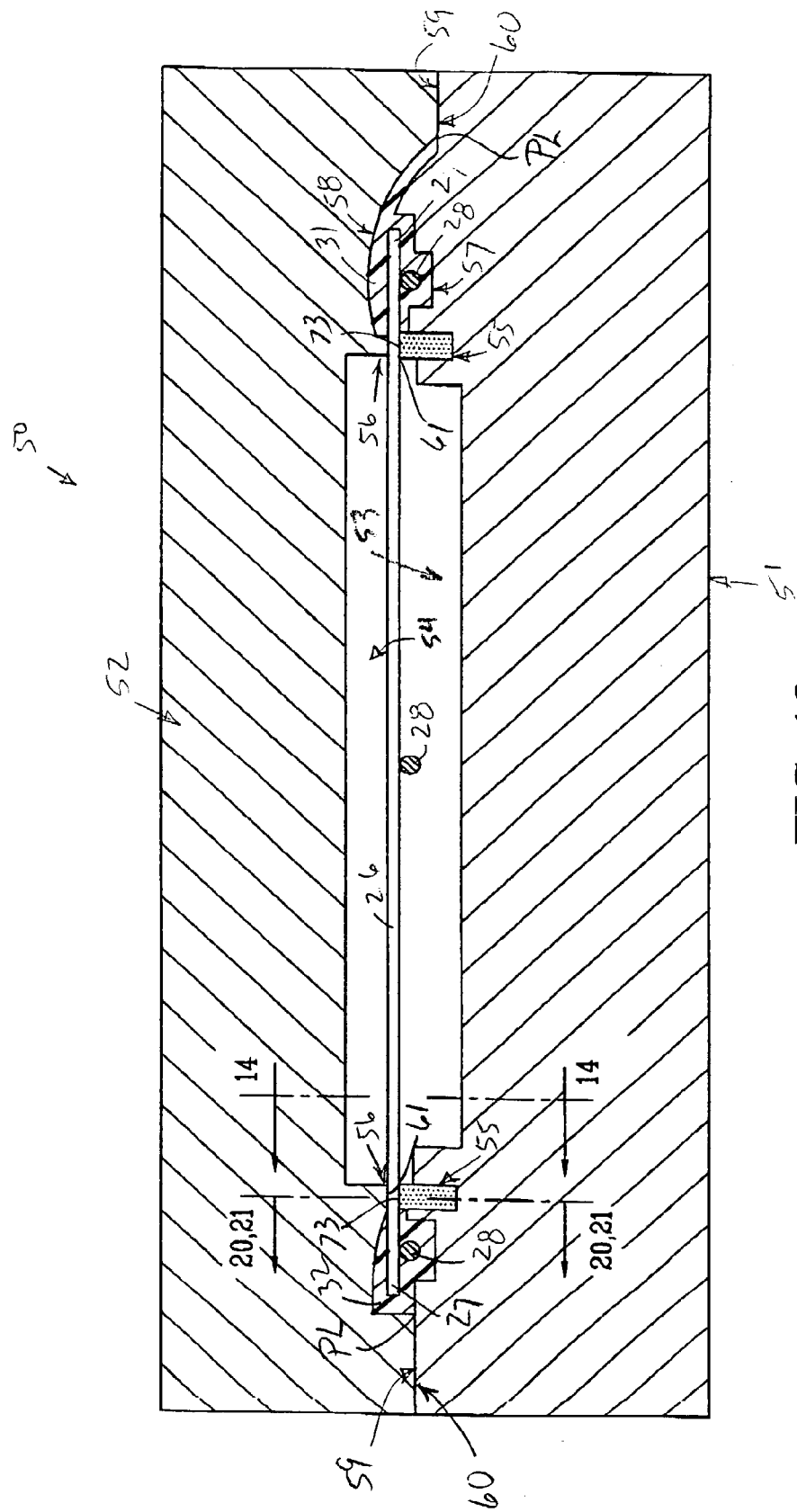
FIG. 12 is a vertical cross-sectional view of the injection mold of FIG. 11, and illustrates the mold in its closed position with portions of the wire members being encapsulated by front and rear border portions of the injection molded open border.
Figure 18:
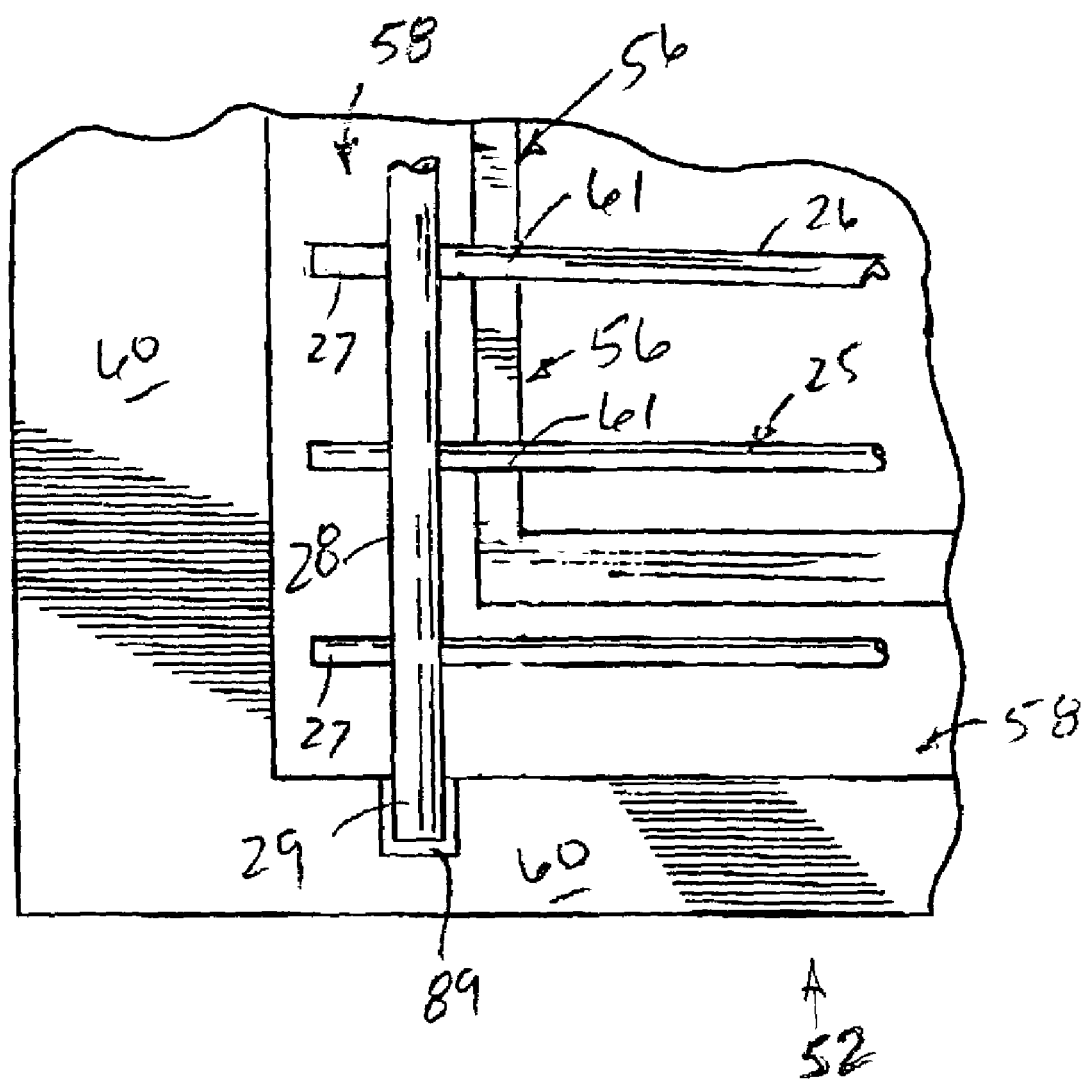
FIG. 18 is a fragmentary enlarged view taken generally along line 18—18 of FIG. 11, and illustrates details of the stationary mold half including a corner cavity portion and grooves for receiving and accurately locating wire ends prior to mold closure.

The wire shelf 20 is manufactured by first constructing the shelf grating 25 in the manner described and thereafter in situ molding the border 20 relative thereto in an injection mold 50 (FIGS. 11 through 14 and 18 through 21) which is defined by a steel stationary or fixed mold half 51 and a movable steel Class "A" mold half 52. The mold halves 51, 52 include respective opposing generally polygonal or rectangular central cavity portions 53, 54, respectively; peripherally disposed, aligned and opposing wire member aligning and sealing means 55, 56, respectively; and outboard of the latter respective peripherally extending continuous border molding cavity portions 57, 58, respectively, into which thermoplastic material is injected in a conventional manner when the mold 50 is closed (FIG. 12). Outer peripheral parting line surfaces 59, 60 (FIGS. 11 and 12) of the respective mold halves 53, 54 are in intimate contact with each other when closed (FIG. 12) and collectively define the outermost periphery (unnumbered) of the peripheral border molding cavity portions 57, 58. When the thermoplastic material is injected into the closed border molding cavity portions 57, 58, the parting line surfaces 59, 60, though in intimate contact with each other, impart a so-called parting line PL (FIGS. 2, 3,12 and 16) to the entire outer periphery of the border 30 which, though not readily discernable, is nonetheless visible and evident, particularly upon close examination. The outer peripheral parting line PL at the front border portion 31 (FIG. 3) and the rear border portion 32 (FIG. 16) is virtually indiscernible because of its location, as is also true of the outer peripheral parting line PL along the side border portions 33, 34 which, obviously, cannot be seen when the shelf 20 is installed in the compartment C (FIG. 1). However, of major concern is an inboard peripheral parting line $PL_W$ (FIGS. 15 and 17) along the entire inner peripheral surface (unnumbered) of the border 30 which must be maintained as indiscernible as possible though recognizing that total elimination thereof is impossible and is acerbated by the closure of the mold halves 51, 52 at the opposing wire member locating and sealing means 55, 56 of the respective mold halves 51, 52.

As is best illustrated in FIGS. 11, 12, 13, 14 and 18 through 21, the wire member locating and sealing means 56 of the movable mold half 52 includes a plurality of downwardly opening wire member receiving, locating and sealing cavities 61, each spaced an axial distance from each other corresponding to the axial distance between adjacent wire members 26 such that the exterior surface (unnumbered) of each wire member 26 is intimately engaged and sealed by the surface of an associated groove or cavity 61 (FIGS. 19 through 21). Furthermore, each wire member sealing cavity 61 defines an arc of substantially 150° (FIG. 19) which is equally foreshortened relative to the 180° upper one-half surface of each wire member 26 by 15 degrees at each side thereof (FIG. 19). The latter relationship assures that upon the insertion of the shelf grate 25 into the mold half 52 of the open mold 50 (FIG. 11), each of the wire members 26 will seat intimately into an associated wire member locating and sealing cavity portion 61 and is retained therein by conventional magnets (not shown) carried by the movable mold half 52. Between adjacent wire member sealing cavities 61 there is a surface 62 (FIGS. 14 and 19 through 21) with all of the surfaces 62 lying in a common plane $CP_m$ of the movable mold half 52 which in the fully closed position (FIG. 21) of the mold 50 bears against a sealing surface 72 between upwardly opening wire member-receiving cavity portions or grooves 73 of the wire member locating and sealing means 55 which is preferably one or a plurality of silicone sealing members bordering substantially the entirety of the central cavity portion 53. Each wire member sealing cavity portion or groove 73 includes a circumferential sealing surface 74 (FIG. 19) which circumscribes an arc of approximately 160° and terminates at each end in a sealing wall 75, 76. The substantially parallel sealing walls 75, 76 are spaced from each other a distance corresponding substantially to the diameter of the wires 26 which permits each wire member 26 to be readily inserted into an associated cavity portion or groove 73 of the sealing means or sealing member 55 as the movable mold half 52 moves from the open position (FIGS. 11 and 19) to a partially closed position (FIG. 20) and finally to the fully closed position (FIGS. 12 and 21). The walls 75, 76 can diverge very slightly (one to three degrees to the vertical), as viewed in FIG. 19 to further assure that the wires 26 will each readily enter a sealing cavity portion or groove 73 of the sealing member 55.

As each wire or wire member 26 progressively enters an associated sealing groove 73 and moves further downwardly therein during closing movement of the movable mold half 52, the opposing sealing surfaces 61, 74; 62, 72 move toward each other until the surfaces 62, 72 touch (FIG. 20), and at this point the sealing member 55 is not compressed and the surfaces 62, 72 lie in the common plane $CP_M$ of the fully open mold 50 (FIG. 19). In the position of the mold halves 51, 52 illustrated in FIG. 20 there are minute gaps G, G between an exterior surface (unnumbered) of each wire member 26 and the walls 75, 76 of each sealing cavity or groove 73. However, as the movable mold half 52 moves from the position shown in FIG. 20 to the position shown in FIG. 21, the sealing member 55 compresses and the material thereof adjacent the walls 75, 76 is squeezed in all directions including inwardly to close the gaps G, G, as is illustrated in FIG. 21, at which point the common plane $CP_M'$ is below the original common plane $CP_M$ but is spaced above a plane $P_A$ through the axes (unnumbered) of the wire members 26 (FIGS. 16, 17 and 21). The normal distance between the two planes $CP_M$ and $CP_M'$ is effectively the distance the sealing member 55 has been compressed to close the gaps G (FIG. 20) associated with each of the wires or wire members 26. Though not perhaps entirely closed, the gaps G, G of FIG. 20 are closed sufficiently when the mold 50 is completely closed (FIG. 21) such that not only is the parting line $PL_W$ (FIGS. 15 and 17) substantially indiscernible, but little if any flash is evident at the areas of the closed gaps G, G. Thus, the Class "A" finish of an upper peripheral surface US of the border 30 set-off between the parting lines PL, $PL_W$, the virtual indiscernible nature of the parting lines PL, $PL_W$, and the minimization of flash in the areas of the substantially closed gaps G, G (FIG. 21) collectively create a wire shelf 20 having an overall appearance from above which is of superior aesthetic qualities, particularly surface shine, smoothness, consistency and overall superior appearance.

It is to be understood that the description just presented with respect to the in situ injection molded encapsulation of the border 30 has been described predominantly with respect to the wire members 26 and the relationship thereof to the front and rear border portions 31, 32, respectively. However, the centermost wire member 28 (FIG. 1) is likewise identically encapsulated with respect to the side border portions 33, 34 in association with correspondingly dimensioned and structurally and functionally related wire member locating, aligning and sealing cavity portions or grooves 61, 73 of respective sealing means 55, 56 during the forming of the side border portions 33, 34. Therefore, during the in situ injection molding of the border 30, all wires or wire members 26, 28 which are exposed in FIG. 1 are located in and are sealed relative to opposing sealing cavity portions or grooves 61, 73 of the respective sealing means or sealing members 55, 56 of the respective mold halves 51, 52 upon the closing thereof and the subsequent in situ injection molding of the continuous border 30 relative to the associated wire members 26, 28. Obviously, the ends 29 of the wire members 28 totally encapsulated in the front and rear border portions 31, 32, respectively, are housed in opposing substantially semi-cylindrical corner cavity portions 79, 89 (FIGS. 13 and 18, respectively) of the respective mold halves 51, 52 which in the closed position of the mold 50 define a closed ended cylindrical cavity to encapsulate the ends 29 thereof.

Figure 5:
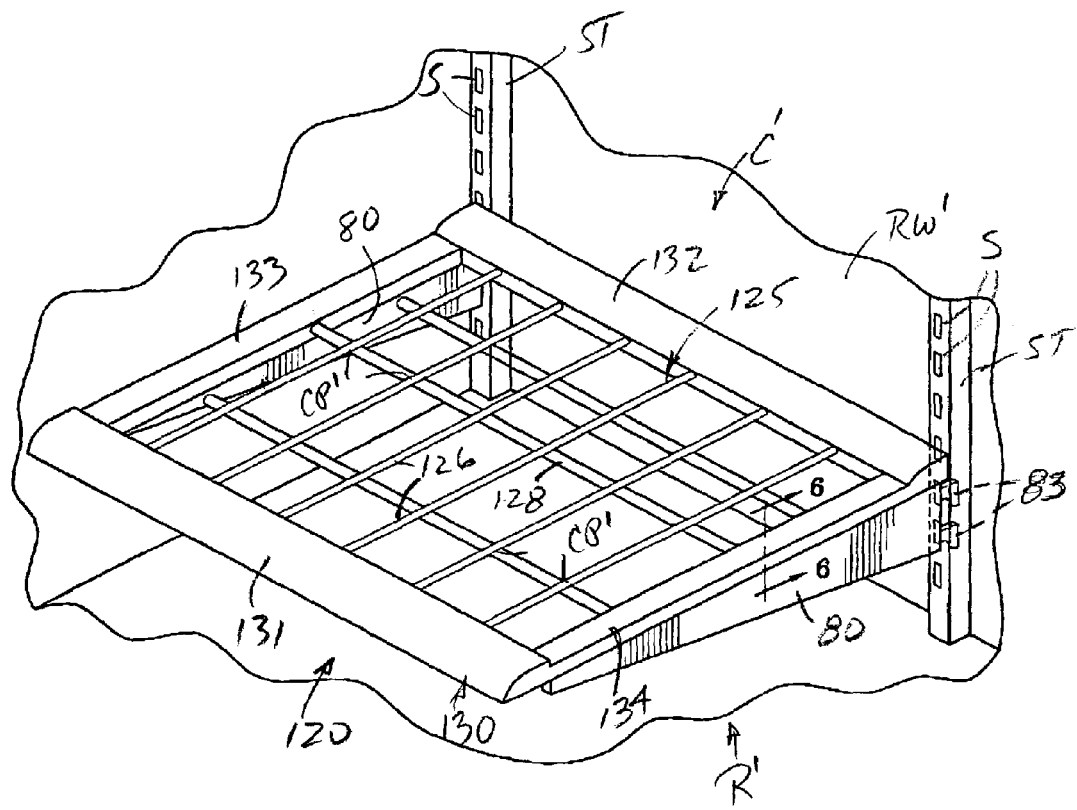
FIG. 5 is a fragmentary perspective view of another wire shelf of the invention, and illustrates the shelf grate and two metal shelf brackets having hooked ends unitized by an injection molded border of polymeric/copolymeric plastic material.
Figures 6, 6A:
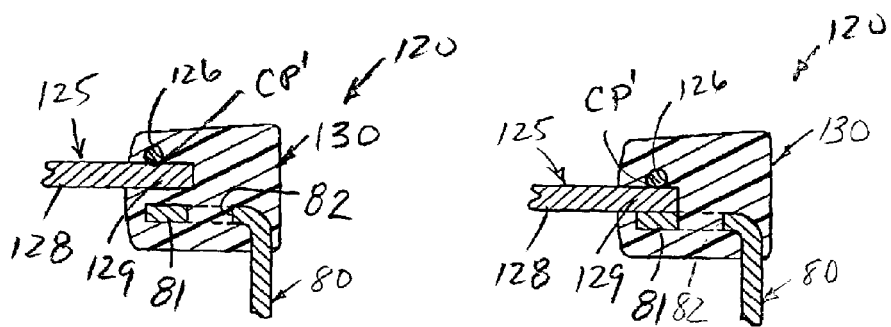
FIG. 6 is an enlarged cross-sectional view taken generally along line 6—6 of FIG. 5
FIG. 6a is a variation thereof, and each illustrates a side border portion of the wire shelf unitizing the shelf grate to a flange of one of the shelf brackets in respective spaced and contacting relationship therewith.

Another wire shelf constructed in accordance with the invention is illustrated in FIGS. 5 and 6 of the drawings and is generally designated by the reference numeral 120.

The wire shelf 120 is constructed substantially in the same manner as the wire shelf 20 of FIG. 1 and includes a substantially identical shelf grate 125 and an open, continuous injection molded encapsulation, border or rim 130 defined by a front border portion 131, a rear border portion 132, and opposite side border portions 133, 134. The shelf grate 125 includes metal wire members or wires 126, 128 welded at cross points CP' and having all ends thereof encapsulated within the border 130. However, as compared to the wire shelf 20 of FIG. 1, the wire shelf 120 of FIGS. 5 and 6 is not slidable with respect to a refrigerator compartment C', but is instead capable of being adjusted vertically therein in the manner set forth in U.S. Pat. No. 5,362,145 granted on Nov. 8, 1994, particularly FIGS. 1 and 5 thereof, the description of which is incorporated hereat by reference. More specifically, a pair of metal cantilever shelf brackets 80, 80 are each provided along an upper edge with a flange 81 (FIG. 6) having a plurality of openings 82 therealong. A rear edge (unnumbered) of each bracket 80 includes a pair of hooks 83 which are received in vertically spaced slots S of conventional vertically disposed substantially parallel shelf tracks ST secured to a rear wall RW' of the compartment C' of a refrigerator R'. The flanges 81 of the opposite cantilevered shelf brackets 80 are in opposing relationship to each other and are positioned in a mold similar to the mold 50 except the lower fixed mold body 51 has separate segments, preferably a central and two side segments, which when open receive the shelf brackets 80 and when closed retain the same with the flanges 81 thereof adjacent but slightly spaced from (FIG. 6) or touching (FIG. 6a) the three wire members 128, two of which are not illustrated but one is encapsulated within each of the front and rear border portions 131, 132, respectively. A mold such as that disclosed in U.S. Pat. No. 5,540,493 is exemplary of the type of mold which could be utilized to manufacture the wire shelf 120. When the corresponding mold just described is closed and hot polymeric/copolymeric plastic material is injected into the corresponding annular mold cavity, as would be defined by closing the border mold cavity portions 57, 58 of the mold 50, the border 130 encapsulates and unitizes the shelf grate 125 to the flanges 81 of the cantilevered shelf brackets 80 in the manner apparent from FIGS. 6 and 6a of the drawings. Therefore, instead of being slidable in the manner of the wire shelf 20 with respect to the compartment C, the wire shelf 120 is cantilevered relative to the compartment C' and is vertically adjustable relative thereto in a conventional manner by suitably selectively hooking the hooks 83 in selected slots S of the shelf tracks ST.

Figure 7:
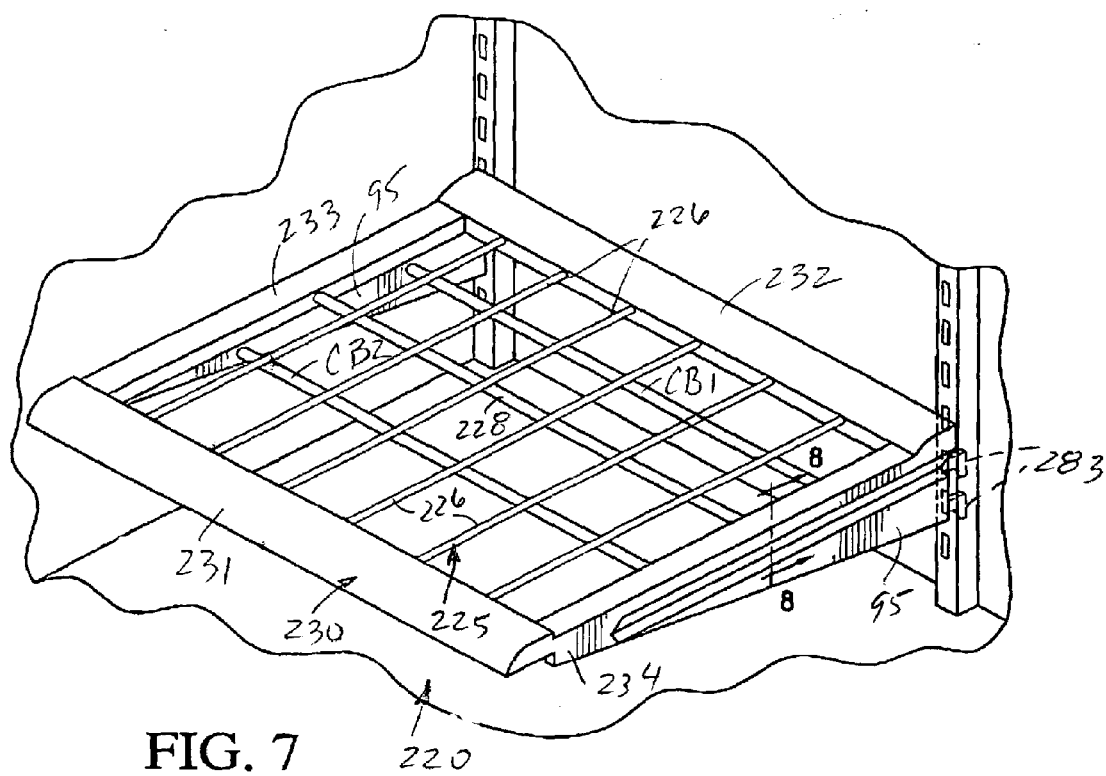
FIG. 7 is a fragmentary perspective view of another wire shelf constructed in accordance with this invention, and illustrates the shelf mounted for sliding movement relative to a pair of cantilevered sheet metal shelf brackets.
Figure 8:
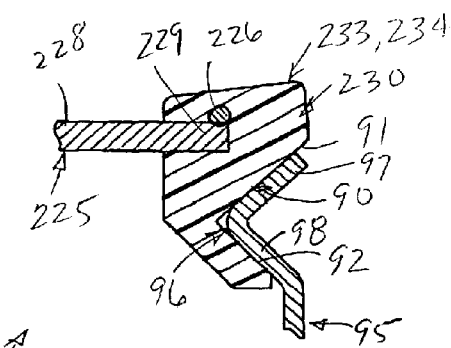
FIG. 8 is a enlarged fragmentary cross-sectional view taken generally along line 8—8 of FIG. 7, and illustrates the sliding relationship between a side border portion of the wire shelf border and one of the cantilevered brackets.

Another wire shelf constructed in accordance with the invention is illustrated in FIGS. 7 and 8 of the drawings and is generally designated by the reference numeral 220. Components of the wire shelf 220 which are identical to the wire shelf 20 of FIG. 1 have been identically numbered but are each preceded by 200.

As is the case of the wire shelf 20, the wire shelf 220 is also a sliding shelf, and is essentially manufactured in substantially the same manner as heretofore described with respect to the latter two shelves and includes a shelf grate 225 defined by wire members or wires 226, 228 having ends thereof or being entirely encapsulated by an injection molded, open, peripheral encapsulation, rim or border 230 defined by substantially parallel front and rear border portions 231, 232, respectively, and opposite substantially parallel side border portions 233, 234. Each of the side border portions 233, 234 of the border 230 is provided with a relatively elongated outwardly opening substantially V-shaped groove 90 defined by angularly outwardly diverging walls 91, 92 (FIG. 8). A metal cantilevered bracket 95 is in sliding relationship with each of the side border portions 233, 234 through a rib 96 defined by longitudinally extending walls 97, 98 which are angled complementary to and slide relative along the surfaces 91, 92, respectively, of the groove 90. Therefore, in accordance with this embodiment of the invention, the wire shelf 220 can slide relative to the pair of brackets 95, 95 and can be step-wise adjusted vertically utilizing hooks 283, 283 in the manner heretofore described with respect to the shelf 120 of FIGS. 5 and 6 of the drawings and the similarly slidable and vertically step-wise adjustable shelf of FIGS. 2 and 6 of U.S. Pat. No. 5,362,145, the latter details of which are herein incorporated by reference, including the utilization of a pair of cross braces CB1, CB2 spanning between and welded to the brackets 95, 95 to impart rigidity thereto and permit the same to be simultaneously step-wise adjusted.

Figure 9:
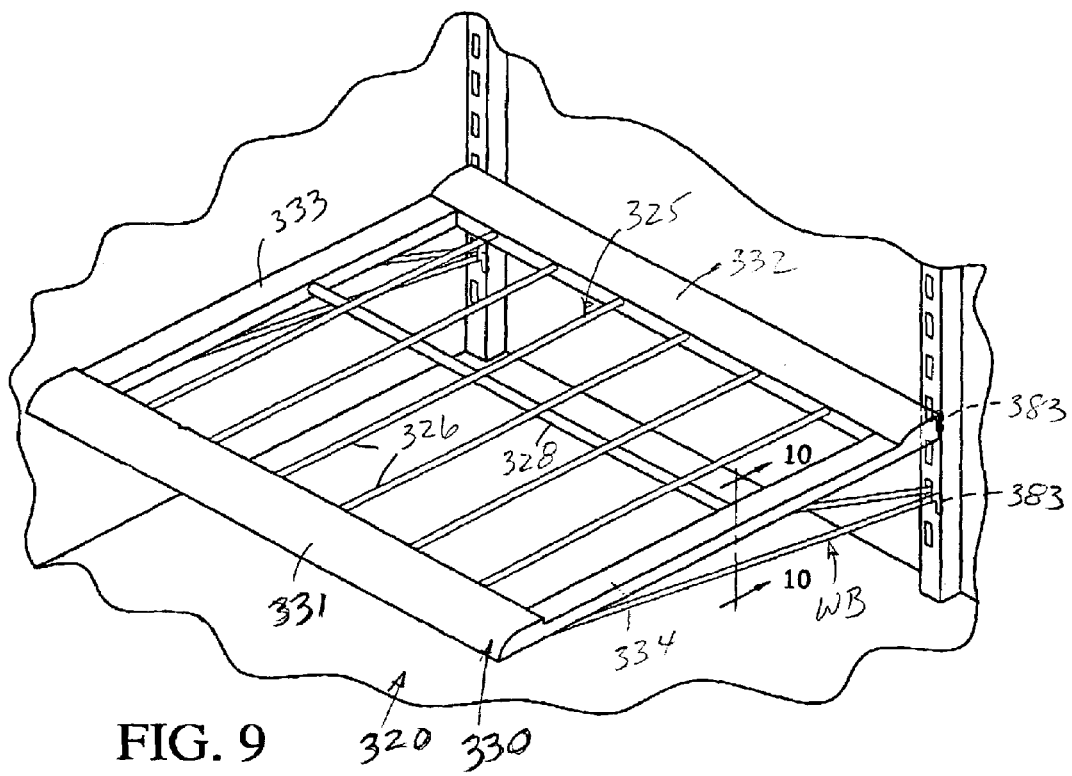
FIG. 9 is a fragmentary perspective view of another wire shelf constructed in accordance with this invention, and illustrates a pair of cantilevered wire shelf brackets in which two of the wires thereof project rearwardly from a rear border portion and define hooks for securing the wire shelf into slots of a vertical track of the refrigerator compartment.
Figure 10:
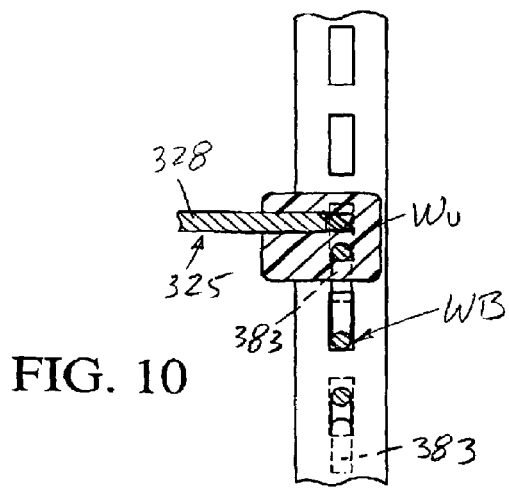
FIG. 10 is an enlarged cross-sectional view taken generally along line 10—10 of FIG. 9, and illustrates the side border portion of the wire shelf border unitizing the shelf grate with wires defining the cantilevered wire shelf bracket.

Another wire shelf 320 constructed in accordance with this invention is generally similar to the shelves heretofore described and is manufactured in much the same manner and, therefore, includes identical reference characters reflective of identical structure and/or function and therefore preceded by 300. The wire shelf 320 of FIGS. 9 and 10 includes a shelf grate 325 peripherally encapsulated by an injection molded encapsulation border or rim 330 having front and rear border portions 331, 332, respectively, and substantially parallel side border portions 333, 334, the latter of which each is unitized through the in situ encapsulation 320 to an upper wire $W_U$ (FIG. 10) of a wire bracket WB which preferably corresponds to the cantilever wire brackets and cross braces associated therewith of FIG. 39 of U.S. Pat. No. 5,441,338 granted on Aug. 15, 1995 which is incorporated hereat by reference. However, as compared to the latter disclosure, the wire shelf 320 is not slidable but instead can only be step-wise adjusted. Though the encapsulation of the upper wires $W_U$ offers reasonable rigidity to the overall wire shelf 320, even absent cross braces between and welded to the wire cantilevered brackets WB, such cross braces can be utilized. Added thereto or in lieu thereof, the ends of the wire members or wires 328 not only rest upon the upper wires $W_U$ of each cantilever wire bracket $W_B$, but can be welded thereto (FIG. 10).

Though each of the shelves is disclosed in association with a compartment of a refrigerator, it is to be understood that the shelves are equally adapted for use in any environment in which product/articles of different heights, sizes and weights are stored, either short term or long, and may require accessibility. For example, the wire shelf 20 is particularly adapted for utilization in a chamber of a microwave oven. Typically, microwave ovens utilize metal wire racks, shelves or grates with are supported at corners thereof by wire ends or legs which rest upon plastic or similar nonconductive supports which are in turn supported by metallic walls of the microwave oven compartment. It is not uncommon for the wire legs to become dislodged from the electrically nonconductive supports and touch or become so closely spaced to the metal walls of the microwave oven compartment so as to cause electrical arcing or current flow which typically produces burn spots and can actually produce holes in the area of the arcing. The wire shelf 20 eliminates the latter problem because the ends 29 of the wires 28 projecting endwise from the front and rear border portions 31, 32, respectively, are coated with the nonconductive synthetic copolymeric/polymeric plastic material and can rest directly upon metallic ledges, ridges or rails of the microwave oven compartment side walls exactly in the manner illustrated in FIG. 1 absent undesired electrical arc-over or arcing.

Although a preferred embodiment of the invention has been specifically illustrated and described herein, it is to be understood that minor variations may be made in the apparatus without departing from the spirit and scope of the invention, as defined by the appended claims.

What is claimed is:

1. A shelf comprising a plurality of substantially elongated relatively spaced first members, at least one substantially elongated second member in transverse crossing superposed relationship to said plurality of elongated first members, a substantially continuous open peripheral border of molded synthetic thermoplastic material encapsulating ends of said first and second members, at least another substantially elongated second member disposed in substantially parallel relationship to said at least one elongated second member, said peripheral border being defined by spaced substantially parallel side border portions and spaced substantially parallel front and rear border portions, one of said elongated one and another second members extending substantially the length of and being substantially entirely encapsulated by one of said front and rear border portions of said substantially continuous open peripheral border, and the other of said elongated one and another second members extending substantially the distance between said side border portions and being substantially devoid of thermoplastic encapsulating material between the ends thereof.

2. The shelf as defined in claim 1 including a pair of shelf brackets located one each along each of said substantially parallel side border portions, and each shelf bracket including means for securing the shelf to a vertical support.

3. The shelf as defined in claim 2 wherein said pair of shelf brackets are at least partially encapsulated by said side border portions.

4. The shelf as defined in claim 3 wherein said shelf brackets are sheet metal.

5. The shelf as defined in claim 3 wherein said shelf brackets are wire.

6. A shelf comprising a plurality of substantially elongated relatively spaced first members, at least one substantially elongated second member in transverse crossing superposed relationship to said plurality of elongated first members, a substantially continuous open peripheral border of molded synthetic thermoplastic material encapsulating ends of said first and second members, said substantially continuous open peripheral border includes opposite substantially parallel side border portions and opposite substantially parallel front and rear border portions each defined in part by inboard and outboard surfaces, said at least one elongated second member being substantially encapsulated between inboard and outboard surfaces of one of said front and rear border portions, and ends of said plurality of elongated first members being encapsulated in said side border portions between the inboard and outboard surfaces thereof.

7. The shelf as defined in claim 6 including a pair of shelf brackets located one each along each of said substantially parallel side border portions, and each shelf bracket including means for securing the shelf to a vertical support.

8. The shelf as defined in claim 7 wherein said pair of shelf brackets are at least partially encapsulated by said side border portions.

9. The shelf as defined in claim 8 wherein said shelf brackets are sheet metal.

10. The shelf as defined in claim 8 wherein said shelf brackets are wire.

11. A shelf comprising a plurality of substantially elongated relatively spaced first members, at least one substantially elongated second member in transverse crossing relationship to said plurality of elongated first members, a substantially continuous open peripheral border of molded synthetic thermoplastic material encapsulating ends of said first and second members, said continuous open peripheral border includes opposite substantially parallel border portions each defined in part by inboard and outboard surfaces, said at least one elongated second member being substantially encapsulated between inboard and outboard surfaces of one of said border portions, ends of said plurality of elongated first members being encapsulated in said one border portion between the inboard and outboard surfaces thereof, and ends of said at least one elongated second member project beyond opposite ends of said one border portion.

12. A shelf comprising a plurality of substantially elongated relatively spaced first members, at least one substantially elongated second member in transverse crossing relationship to said plurality of elongated first members, a substantially continuous open peripheral border of molded synthetic thermoplastic material encapsulating ends of said first and second members, said substantially continuous open peripheral border includes opposite substantially parallel border portions each defined in part by inboard and outboard surfaces, said at least one elongated second member being substantially encapsulated between inboard and outboard surfaces of one of said border portions, ends of said plurality of elongated first members being encapsulated in said one border portion between the inboard and outboard surfaces thereof, and ends of said at least one elongated second member project beyond opposite ends of said one border portion and are encapsulated by the thermoplastic material.

13. A shelf comprising a plurality of substantially elongated relatively spaced first members, at least one substantially elongated second member in transverse crossing superposed relationship to said plurality of elongated first members, a substantially continuous open peripheral border of molded synthetic thermoplastic material encapsulating ends of said first and second members, at least another and a further substantially elongated second member each disposed in substantially parallel spaced relationship to said at least one elongated second member, said another and further elongated second members having ends encapsulated by said substantially continuous open peripheral border; and at least two of said one, another and further elongated second members extend between substantially parallel spaced side border portions of said peripheral border and are substantially encapsulated by substantially parallel spaced front and rear border portions of said substantially continuous open peripheral border.

14. The shelf as defined in claim 13 including a pair of shelf brackets located one each along each of said substantially parallel side border portions, and each shelf bracket including means for securing the shelf to a vertical support.

15. The shelf as defined in claim 14 wherein said pair of shelf brackets are at least partially encapsulated by said side border portions.

16. The shelf as defined in claim 15 wherein said shelf brackets are sheet metal.

17. The shelf as defined in claim 15 wherein said shelf brackets are wire.

18. A shelf comprising a plurality of substantially elongated relatively spaced first members, at least one substantially elongated second member in transverse crossing superposed relationship to said plurality of elongated first members, a substantially continuous open peripheral border of molded synthetic thermoplastic material encapsulating ends of said first and second members, at least another and a further substantially elongated second member each disposed in substantially parallel spaced relationship to said at least one elongated second member, said another and further elongated second members having ends encapsulated by said substantially continuous open peripheral border; at least two of said one, another and further elongated second members extend between substantially parallel spaced side border portions of said peripheral border and are substantially encapsulated by substantially parallel spaced front and rear border portions of said substantially continuous open peripheral border; and the remaining one of said one, another and further elongated second members being substantially devoid of thermoplastic encapsulating material between the ends thereof.

19. The shelf as defined in claim 18 including a pair of shelf brackets located one each along each of said substantially parallel side border portions, and each shelf bracket including means for securing the shelf to a vertical support.

20. The shelf as defined in claim 19 wherein said pair of shelf brackets are at least partially encapsulated by said side border portions.

21. The shelf as defined in claim 20 wherein said shelf brackets are sheet metal.

22. The shelf as defined in claim 20 wherein said shelf brackets are wire.

23. A shelf comprising a substantially continuous open peripheral border formed of in situ molded synthetic thermoplastic material, said substantially continuous open peripheral border having an upper surface possessing superior surface characteristics as compared to a lower surface thereof, a parting line along a peripheral surface of said substantially continuous peripheral border defining a line of demarcation between said upper and lower surfaces, said parting line lying in a substantially common plane, a plurality of substantially elongated members each having an axis and opposite ends, said opposite ends being encapsulated by said substantially continuous open peripheral border, and in a substantially horizontal position of use of said shelf said parting line plane being disposed above a plane through said elongated member axes whereby the superior surface characteristics of the substantially continuous open peripheral border are aesthetically presented to a viewer of the shelf.

24. The shelf as defined in claim 23 including at least one substantially elongated second member in underlying crossing supporting relationship to said first-mentioned plurality of elongated members.

25. The shelf as defined in claim 24 including means for securing said one and second elongated members to each other at least at selective crossing points thereof.

26. The shelf as defined in claim 23 including at least one substantially elongated second member in underlying crossing supporting relationship to said first-mentioned plurality of elongated members, and ends of said second member being encapsulated by said substantially continuous open peripheral border.

27. The shelf as defined in claim 26 including means for securing said one and second members to each other at least at selective crossing points thereof.

28. The shelf as defined in claim 23 including a pair of shelf brackets located in substantially parallel spaced relationship relative to said peripheral border, and each shelf bracket including means for securing the shelf to a vertical support.

29. The shelf as defined in claim 28 wherein said pair of shelf brackets are at least partially encapsulated by said peripheral border.

30. The shelf as defined in claim 29 wherein said shelf brackets are sheet metal.

31. The shelf as defined in claim 30 including at least one substantially elongated second member in underlying crossing supporting relationship to said first-mentioned plurality of elongated members.

32. The shelf as defined in claim 29 wherein said shelf brackets are wire.

33. The shelf as defined in claim 32 including at least one substantially elongated second member in underlying crossing supporting relationship to said first-mentioned plurality of elongated members.

34. The shelf as defined in claim 29 including at least one substantially elongated second member in underlying crossing supporting relationship to said first-mentioned plurality of elongated members.

35. The shelf as defined in claim 28 including at least one substantially elongated second member in underlying crossing supporting relationship to said first-mentioned plurality of elongated members.

36. A shelf comprising a plurality of substantially elongated relatively spaced first members disposed in substantially parallel relationship to each other, each of said elongated first members having opposite ends, a pair of substantially elongated relatively spaced second members disposed in substantially parallel relationship to each other, each of said elongated second members having opposite ends, said elongated first and second members being in crossing relationship to each other with said elongated first members being above said elongated second members, means for securing said elongated first and second members to each other at least at selective crossing points thereof, a substantially continuous open peripheral border of molded synthetic thermoplastic material encapsulating the ends of said elongated first and second members, said pair of elongated second members being each substantially encapsulated by said synthetic thermoplastic material, and said elongated first members being substantially devoid of said synthetic thermoplastic material between the ends thereof.

37. The shelf as defined in claim 36 including at least another substantially elongated second member disposed in substantially parallel relationship to said at least one elongated second member.

38. The shelf as defined in claim 36 including at least another substantially elongated second member disposed in substantially parallel relationship to said pair of elongated second members, and said another elongated second member being substantially devoid of said synthetic thermoplastic material between ends thereof.

39. The shelf as defined in claim 36 including at least another substantially elongated second member disposed between and in substantially parallel relationship to said pair of elongated second members, and said another elongated second member being substantially devoid of said synthetic thermoplastic material between ends thereof.

40. The shelf as defined in claim 36 wherein said substantially continuous open peripheral border has an upper surface possessing superior surface characteristics as compared to a lower surface thereof, a parting line along a peripheral surface of said substantially continuous open peripheral border defining a line of demarcation between said upper and lower surfaces, said parting line lying in a substantially common plane, said elongated first members each having an axis, and in a substantially horizontal position of use of said shelf said parting line plane is disposed above a plane through said elongated first member axes whereby the superior surface characteristics of the substantially continuous open peripheral border are aesthetically presented to a viewer of the shelf.

41. The shelf as defined in claim 36 including a pair of shelf brackets located in substantially parallel spaced relationship relative to said peripheral border, and each shelf bracket including means for securing the shelf to a vertical support.

42. The shelf as defined in claim 41 wherein said pair of shelf brackets are at least partially encapsulated by said peripheral border.

43. The shelf as defined in claim 42 wherein said shelf brackets are sheet metal.

44. The shelf as defined in claim 42 wherein said shelf brackets are wire.

45. A shelf comprising a plurality of substantially elongated relatively spaced first members disposed in substantially parallel relationship to each other, each of said elongated first members having opposite ends, a pair of substantially elongated relatively spaced second members disposed in substantially parallel relationship to each other, each of said elongated second members having opposite ends, said elongated first and second members being in crossing relationship to each other with said elongated first members being above said elongated second members, means for securing said elongated first and second members to each other at least at selective crossing points thereof, a substantially continuous open peripheral border of molded synthetic thermoplastic material encapsulating the ends of said elongated first members, said substantially continuous open peripheral border includes opposite substantially parallel border portions each defined in part by inboard and outboard surfaces, one of said pair of elongated second members being substantially encapsulated by one of said parallel border portions except for axially opposite ends thereof each of which project beyond an outboard surface of an associated border portion, and said elongated first members being substantially devoid of said synthetic thermoplastic material between the ends thereof.

46. The shelf as defined in claim 45 including at least another substantially elongated second member disposed in substantially parallel relationship to said at least one elongated second member.

47. The shelf as defined in claim 45 including at least another substantially elongated second member disposed in substantially parallel relationship to said pair of elongated second members, and said another elongated second member being substantially devoid of said synthetic thermoplastic material between ends thereof.

48. The shelf as defined in claim 45 including at least another substantially elongated second member disposed between and in substantially parallel relationship to said pair of elongated second members, and said another elongated second member being substantially devoid of said synthetic thermoplastic material between ends thereof.

49. A shelf comprising a plurality of substantially elongated relatively spaced first members disposed in substantially parallel relationship to each other, each of said elongated first members having opposite ends, a pair of substantially elongated relatively spaced second members disposed in substantially parallel relationship to each other, each of said elongated second members having opposite ends, said elongated first and second members being in crossing relationship to each other with said elongated first members being above said elongated second members, means for securing said elongated first and second members to each other at least at selective at crossing points thereof, a substantially continuous open peripheral border of molded synthetic thermoplastic material encapsulating the ends of said thin elongated first members, said substantially continuous open peripheral border includes opposite substantially parallel border portions each defined in part by inboard and outboard surfaces, one of said pair of elongated second members being substantially encapsulated by one of said parallel border portions including axially opposite ends thereof each of which project beyond an outboard surface of an associated border portion, and said elongated first members being substantially devoid of said synthetic thermoplastic material between the ends thereof.

50. The shelf as defined in claim 49 including at least another substantially elongated second member disposed in substantially parallel relationship to said at least one elongated second member.

51. The shelf as defined in claim 49 including at least another substantially elongated second member disposed in substantially parallel relationship to said pair of elongated second members, and said another elongated second member being substantially devoid of said synthetic thermoplastic material between ends thereof.

52. The shelf as defined in claim 49 including at least another substantially elongated second member disposed between and in substantially parallel relationship to said pair of elongated second members, and said another elongated second member being substantially devoid of said synthetic thermoplastic material between ends thereof.

53. A shelf structure comprising a pair of opposing substantially horizontally aligned slide surfaces, said slide surfaces have adjacent surfaces spaced a predetermined distance from each other, a shelf defined by a plurality of wires and at least a pair of side border portions of synthetic thermoplastic material, said side border portions each having an outermost side surface spaced from each other a distance corresponding substantially to said predetermined distance whereby the relative close spacing between said adjacent surfaces and said outermost side surfaces prevent excessive lateral shifting of said shelf relative to said slide surfaces, and ends of selected ones of said plurality of wires project beyond said side border portions and slide atop said slide surfaces.

54. The shelf structure as defined in claim 53 wherein said selected ones of said wire ends are encapsulated by said synthetic thermoplastic material.

55. The shelf structure as defined in claim 54 wherein said side border portions are in situ molded to said wires.

56. The shelf structure as defined in claim 54 wherein said side border portions in part define a continuous open border.

57. The shelf structure as defined in claim 53 wherein said side border portions are in situ molded to said wires.

58. The shelf structure as defined in claim 57 wherein said side border portions in part define a continuous open border.

59. The shelf structure as defined in claim 53 wherein said side border portions in part define a continuous open border.

60. A shelf comprising a substantially continuous open peripheral border formed of in situ molded synthetic thermoplastic material, said substantially continuous open peripheral border having an upper surface possessing superior surface characteristics as compared to a lower surface thereof, a parting line along a peripheral surface of said substantially continuous peripheral border defining a line of demarcation between said upper and lower surfaces, a plurality of substantially elongated members each having an axis and opposite ends, said opposite ends being encapsulated by said substantially continuous open peripheral border, and in a substantially horizontal position of use of said shelf said parting line plane being disposed above a plane through said elongated member axes whereby the superior surface characteristics of the substantially continuous open peripheral border are aesthetically presented to a viewer of the shelf.

61. The shelf as defined in claim 60 including at least one substantially elongated second member in underlying crossing supporting relationship to said first-mentioned plurality of elongated members.

62. The shelf as defined in claim 61 including means for securing said one and second elongated members to each other at least at selective crossing points thereof.

63. The shelf as defined in claim 60 including at least one substantially elongated second member in underlying crossing supporting relationship to said first-mentioned plurality of elongated members, and ends of said second member being encapsulated by said substantially continuous open peripheral border.

64. The shelf as defined in claim 63 including means for securing said one and second members to each other at least at selective crossing points thereof.

65. The shelf as defined in claim 60 including a pair of shelf brackets located in substantially parallel spaced relationship relative to said peripheral border, and each shelf bracket including means for securing the shelf to a vertical support.

66. The shelf as defined in claim 65 wherein said pair of shelf brackets are at least partially encapsulated by said peripheral border.

67. The shelf as defined in claim 66 wherein said shelf brackets are sheet metal.

68. The shelf as defined in claim 66 wherein said shelf brackets are wire.

69. A shelf comprising a substantially continuous open peripheral border formed of in situ molded synthetic thermoplastic material, said substantially continuous open peripheral border having a first surface possessing superior surface characteristics as compared to a second surface thereof, a parting line along a peripheral surface of said substantially continuous peripheral border defining a line of demarcation between said first and second surfaces, said parting line lying in a substantially common plane, a plurality of substantially elongated members each having an axis and opposite ends, said opposite ends being encapsulated by said substantially continuous open peripheral border, and in a substantially horizontal position of said shelf said parting line plane being disposed above a plane through said elongated member axes whereby the superior surface characteristics of the substantially continuous open peripheral border are aesthetically presented to a viewer of the shelf.

70. The shelf as defined in claim 69 including at least one substantially elongated second member in crossing relationship to said first-mentioned plurality of elongated members.

71. The shelf as defined in claim 70 including means for securing said one and second elongated members to each other at least at selective crossing points thereof.

72. The shelf as defined in claim 69 including at least one substantially elongated second member in crossing relationship to said first-mentioned plurality of elongated members, and ends of said second member being encapsulated by said substantially continuous open peripheral border.

73. The shelf as defined in claim 72 including means for securing said one and second members to each other at least at selective crossing points thereof.

74. The shelf as defined in claim 69 including a pair of shelf brackets located in substantially parallel spaced relationship relative to said peripheral border, and each shelf bracket including means for securing the shelf to a vertical support.

75. The shelf as defined in claim 74 wherein said pair of shelf brackets are at least partially encapsulated by said peripheral border.

76. The shelf as defined in claim 75 wherein said shelf brackets are sheet metal.

77. The shelf as defined in claim 75 wherein said shelf brackets are wire.

78. A shelf comprising a substantially continuous open peripheral border formed of in situ molded synthetic thermoplastic material, said substantially continuous open peripheral border having a first surface possessing superior surface characteristics as compared to a second surface thereof, a parting line along a peripheral surface of said substantially continuous peripheral border defining a line of demarcation between said first and second surfaces, said parting line lying in a substantially common plane, a plurality of substantially elongated members each having an axis and opposite ends, a plurality of said opposite ends being encapsulated by said substantially continuous open peripheral border, at least axially opposite ends of a pair of said plurality of elongated members being devoid of said molded synthetic thermoplastic material, and in a substantially horizontal position of said shelf said parting line plane being disposed above a plane through said elongated member axes whereby the superior surface characteristics of the substantially continuous open peripheral border are aesthetically presented to a viewer of the shelf.

79. The shelf as defined in claim 78 wherein at least a pair of said plurality of substantially elongated members are in substantially parallel relationship to each other.

80. The shelf as defined in claim 78 wherein at least a pair of said substantially parallel elongated members are located one each in front and rear border portions of said peripheral border.

81. The shelf as defined in claim 78 including a pair of shelf brackets located in substantially parallel spaced relationship relative to said peripheral border, and each shelf bracket including means for securing the shelf to a vertical support.

82. The shelf as defined in claim 81 wherein said pair of shelf brackets are at least partially encapsulated by said peripheral border.

83. The shelf as defined in claim 82 wherein said shelf brackets are sheet metal.

84. The shelf as defined in claim 82 wherein said shelf brackets are wire.

* * * * *